(12) United States Patent
Huang

(10) Patent No.: US 12,545,313 B2
(45) Date of Patent: Feb. 10, 2026

(54) ASSEMBLING STRUCTURE, ASSEMBLING MECHANISM, AND CARRIER

(71) Applicant: Wonderland Switzerland AG, Steinhausen (CH)

(72) Inventor: Jihua Huang, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 389 days.

(21) Appl. No.: 18/030,724

(22) PCT Filed: Oct. 8, 2021

(86) PCT No.: PCT/EP2021/077848
§ 371 (c)(1),
(2) Date: Apr. 6, 2023

(87) PCT Pub. No.: WO2022/074188
PCT Pub. Date: Apr. 14, 2022

(65) Prior Publication Data
US 2023/0382445 A1    Nov. 30, 2023

(30) Foreign Application Priority Data
Oct. 9, 2020    (CN) .......................... 202022231524.5

(51) Int. Cl.
*B62B 7/14* (2006.01)
(52) U.S. Cl.
CPC .............. *B62B 7/142* (2013.01); *B62B 7/145* (2013.01); *B62B 2205/20* (2013.01)

(58) Field of Classification Search
CPC ........... B62B 7/142; B62B 7/145; B62B 9/12; B62B 2205/20
See application file for complete search history.

(56) References Cited

U.S. PATENT DOCUMENTS 9,200,746 B2 *  12/2015  Xiao ...................... F16M 11/00
9,399,479 B1     7/2016  Chen
(Continued)

FOREIGN PATENT DOCUMENTS

CN          2678996 Y      2/2005
CN        201998843 U     10/2011
(Continued)

OTHER PUBLICATIONS

"First Office Action Issued in Corresponding Japanese Patent Application No. 2023-521642", Mailed Date: Jul. 1, 2024, 18 pages.
(Continued)

*Primary Examiner* — Steve Clemmons
(74) *Attorney, Agent, or Firm* — Volpe Koenig

(57) ABSTRACT

Disclosed is an assembling structure, including: a body structure; a releasing button; a locking member, and a holding device. The releasing button and the locking member are installed on the body structure, and the locking member has a locked position and an unlocked position. When a releasing operation is performed, the releasing button drives the locking member to switch from the locked position to the unlocked position. The holding device is arranged in the body structure and configured to lock the releasing button at a position, keeping the locking member at the unlocked position. In addition, the present application discloses an assembling mechanism and a carrier.

25 Claims, 10 Drawing Sheets

(56) References Cited

U.S. PATENT DOCUMENTS

| | | | |
|---|---|---|---|
| 9,840,168 B2* | 12/2017 | Yi | B62B 7/142 |
| 11,993,301 B2* | 5/2024 | Cheng | B62B 7/142 |
| 2004/0207242 A1* | 10/2004 | Takamizu | B62B 7/145 |
| | | | 297/256.16 |
| 2005/0184564 A1* | 8/2005 | Takamizu | B60N 2/2848 |
| | | | 297/130 |
| 2006/0237947 A1 | 10/2006 | Michelau et al. | |
| 2010/0219616 A1* | 9/2010 | Dotsey | B62B 7/08 |
| | | | 292/257 |
| 2011/0148168 A1 | 6/2011 | Chen | |
| 2011/0278810 A1* | 11/2011 | Winterhalter | B60N 2/2848 |
| | | | 224/567 |
| 2017/0297599 A1* | 10/2017 | Zhong | B62B 7/142 |
| 2018/0029625 A1* | 2/2018 | Ruggiero | B62B 7/105 |

FOREIGN PATENT DOCUMENTS

| | | | | |
|---|---|---|---|---|
| CN | 202987241 U | | 6/2013 | |
| CN | 203391844 U | | 1/2014 | |
| CN | 205022665 U | * | 2/2016 | |
| CN | 205327145 U | | 6/2016 | |
| CN | 110920739 A | * | 3/2020 | B62B 9/10 |
| CN | 111301508 A | | 6/2020 | |

OTHER PUBLICATIONS

Office Action issued in Chinese Patent Application No. 202110911113.7, dated Sep. 15, 2022.

Office Action issued in Taiwanese Patent Application No. 110137612, dated Jul. 1, 2022.

* cited by examiner

ASSEMBLING STRUCTURE, ASSEMBLING MECHANISM, AND CARRIER

CROSS-REFERENCE TO RELATED APPLICATIONS

This application is a National Stage 371 of International Patent Application No. PCT/EP2021/077848, filed on Oct. 8, 2021, which claims the priority of Chinese Patent Application No. 202022231524.5, filed on Oct. 9, 2020, with the title of "ASSEMBLING STRUCTURE, ASSEMBLING MECHANISM, AND CARRIER", the content of which are hereby incorporated by reference as if set forth in their entirety herein.

TECHNICAL FIELD

The present application relates to the field of infant products, particularly, to an assembling structure, an assembling mechanism, and a carrier.

BACKGROUND

Generally, when a newborn baby is carried out, a stroller may be used to carry the newborn baby. The conventional stroller generally includes a baby sleeping box and a stroller frame. The baby sleeping box is generally detachably installed on the stroller frame, making it convenient to use and to store.

The existing baby sleeping box and the stroller frame are detachably connected through an assembling mechanism. The conventional assembling mechanism includes a clamping structure and an assembling structure that may be detachably locked with the clamping structure. Usually, the assembling structure is provided with a locking member configured to lock and a releasing button configured to drive the locking member to release the locking. By pressing the releasing button, the locking member releases the locking between the clamping structure and the assembling structure, and the baby sleeping box may be removed from the stroller frame.

However, the action of pressing the releasing button is not synchronized with the action of removing the baby sleep box, therefore, in order to remove the baby sleeping box successfully, the releasing button must be continuously pressed, therefore people must press the releasing button with one hand and remove the baby sleeping box with the other hand, making the operation inconvenient.

Therefore, in order to overcome the above-mentioned defects, it is urgent to provide an assembling structure, an assembling mechanism, and a carrier that are convenient to operate.

SUMMARY

An objective of the present application is to provide an assembling structure, which may be easily removed from the clamping structure.

Another objective of the present application is to provide an assembling mechanism that is convenient to operate and easy to disassemble.

Another objective of the present application is to provide a carrier that is convenient to operate and easy to disassemble.

In order to achieve the above objectives, the present application provides an assembling structure, applicable for being detachably locked with a clamping structure. The assembling structure includes a body structure, a releasing button, a locking member, and a holding device. The releasing button and the locking member are installed on the body structure, the locking member has a locked position and an unlocked position, when a releasing operation is performed, the releasing button drives the locking member to switch from the locked position to the unlocked position, and the holding device is arranged in the body structure and configured to lock the releasing button at a position, keeping the locking member at the unlocked position.

Compared with the prior art, the assembling structure of the present application is further provided with the holding device, and the releasing button is locked by the holding device when the assembling structure is locked with the clamping structure and the locking member is at the unlocked position, so that the locking member is kept at the unlocked position. Therefore, in an actual application, when the assembling structure engages with the clamping structure, first the releasing button is operated, and by means of the releasing button, the locking member is switched to the unlocked position. The releasing button will be locked and positioned by the holding device, so that the locking member is kept at the unlocked position, thus causing the assembling structure and the clamping structure to be kept in the unlocked state. At this time, the clamping structure may be easily removed from the assembling structure.

Further, the releasing button and the holding device are locked with each other by engaging.

Further, the holding device includes a locking opening, and when the releasing operation is performed, the releasing button is inserted into the locking opening and engages with the holding device.

Further, the holding device includes a blocking part, and the releasing button is inserted into the locking opening and blocks the blocking part.

Further, a blocked part is arranged on the releasing button, and the blocked part and the blocking part block each other when the releasing button is inserted into the locking opening.

Further, the blocking part and the blocked part are hook structures or protrusion structures.

Further, the body structure is provided with an assembling part configured to engage with a clamping structure.

Further, the locking opening is capable of opening, and when the clamping structure disengages from the assembling part, the locking opening opens, so that the releasing button is released from the holding device.

Further, the holding device further includes a clamping opening configured to allow the clamping structure to be inserted. The clamping opening opens after the clamping structure is inserted, driving the locking opening to narrow. The clamping opening narrows after the clamping structure is detached, to allow the locking opening to open.

Further, the holding device includes two movable members arranged at intervals in a circumferential direction. A middle part of each of the two movable members is pivotally connected to the body structure. First ends of the two movable members are provided with the blocking parts respectively, and the blocking parts define the locking opening. Second ends of the two movable members define the clamping opening.

Further, each of the two movable members is bent in shape.

Further, the holding device further includes a reset member arranged between each of the two movable members and the body structure, and the reset member is configured to drive each of the two movable members to rotate to force the locking opening to open.

Further, the assembling part is a slot. A through hole is disposed in a wall of the assembling part and is in communication with an inner cavity of the body structure. The second end of each of the two movable members is telescopically arranged in the through hole.

Further, the locking member is telescopically arranged in the body structure, and when the releasing operation is performed on the releasing button, the releasing button drives the locking member to retract into the body structure.

Further, the releasing button is telescopically installed on the body structure, and the holding device releases the releasing button after the assembling structure disengages from the clamping structure, so that the releasing button extends out of the body structure and resets.

The assembling structure further includes an elastic member arranged in the body structure, and the elastic member is configured to apply a force to the releasing button to reset the releasing button.

Further, the body structure has an inner cavity, and an assembling part configured to engage with the clamping structure, and a through hole is arranged in a wall of the assembling part and is in communication with the inner cavity of the body structure. The holding device includes a movable member and a reset member, and the movable member and the reset member are disposed in the inner cavity. A middle part of the movable member is pivotally connected to the body structure. A first end of the movable member is provided with a blocking part configured to lock the releasing button, and a second end of the movable member is telescopically arranged in the through hole. When the clamping structure disengages from the assembling part, the reset member applies an elastic force to the movable member, so that the second end of the movable member extends from the through hole and the blocking part disengages from the releasing button.

Further, the holding device includes two movable members and two reset members, each of the two movable members is bent in shape. The assembling part is disposed between the two movable members and is a slot, and the releasing button is disposed between the two movable members.

Further, the releasing button and the locking member both are telescopically installed on the body structure, and a moving direction of the releasing button is perpendicular to a moving direction of the locking member. The assembling structure is further provided with an elastic member, and the elastic member is configured to drive the releasing button to reset and configured to drive the locking member to return to the locked position.

Further, the locking member is pivotally connected to the body structure and arranged in the assembling part. A first end of the locking member is provided with a hook, and when the releasing operation is performed, the releasing button is pressed down and pushes a second end of the locking member, so that the locking member pivots from the locked position to the unlocked position.

The assembling structure further includes a reset elastic member, the reset elastic member is arranged between the releasing button and the body structure, and the reset elastic member is configured to apply a force to the locking member to force the locking member to pivot to the locked position.

Further, the body structure has a button channel configured to allow the releasing button to slide. The blocking part is arranged on part of a channel wall of the button channel, the blocking part and the channel wall of the button channel define the locking opening.

Further, a second end of the locking member is bent to form a pushing structure, and the releasing button and the pushing structure of the locking member are arranged to push against each other.

Further, the body structure comprises a button channel configured to allow the releasing button to slide, the releasing button has an elastic arm, and the elastic arm is provided with a blocked part. The holding device comprises a blocking part arranged on a channel wall of the button channel, and the blocking part is adapted to engage with the blocked part.

Further, the locking member is pivotally connected to the body structure, a first end of the locking member is provided with a hook, a second end of the locking member is provided with a pushing structure, and the releasing button is configured to push the pushing structure to force the locking member to pivot to the unlocked position. The assembling structure is further provided with a reset elastic member, and when the clamping structure disengages with the assembling structure, the clamping structure and the reset elastic member cooperate to drive the locking member to pivot from the unlocked position to the locked position, while the pushing structure pushes the releasing button to reset.

The present application provides an assembling mechanism, including an assembling structure and a clamping structure that are pluggable in, detachable from and lockable with each other. The assembling structure is the assembling structure above. A locked member is arranged on the clamping structure and configured to be locked with the locking member, and the clamping structure is locked on the assembling structure by a locking between the locking member and the locked member.

Further, the locking member is a locking pin, and the locked member is a slot.

It should be understood that, the assembling mechanism of the present application includes the assembling structure and the clamping structure that may be pluggable in, detachable from and lockable with each other, the locked member is arranged on the clamping structure to allow the locking member to be locked. Therefore, when the assembling structure and the clamping structure are plugged in and locked with each other, by operating the releasing button, the releasing button may drive the locking member to move, forcing the locking member to move to the unlocked position, and the locking member will be released from the locked member accordingly. The releasing button will be kept at the unlocked position by the holding device. The locking member is released from the locked member, thus keeping the assembling structure and the clamping structure in the unlocked state. At this time, the clamping structure may be conveniently removed from the assembling structure.

The present application provides an assembling mechanism, including an assembling structure and a clamping structure that are pluggable in, detachable from and lockable with each other. The assembling structure is the assembling structure above. A locked member is arranged on the clamping structure and configured to be locked with the locking member, and the clamping structure is locked on the assembling structure by a locking between a hook of the locking member and the locked member.

Further, the locked member is a rod configured to be hooked by the hook of the locking member.

Further, the clamping structure is provided with a connecting cavity. The locked member is installed in the connecting cavity. An end of the clamping structure is provided with a joint opening in communication with the connecting cavity. When the clamping structure engages with the assembling structure, the locking member is inserted into the connecting cavity through the joint opening to lock the locked member.

Further, the clamping structure is provided with a protrusion disposed at the joint opening. When the clamping structure engages with the assembling structure, and the releasing button is locked at a position where the locking member is released, the protrusion rests against the locking member. When the clamping structure and the assembling structure are disengaging, the protrusion drives the locking member to rotate to the locked position.

A carrier of the present application includes an infant carrying mechanism, a carrier body, and an assembling mechanism. The infant carrying mechanism and the carrier body are detachably installed by the assembling mechanism, and the assembling mechanism is the assembling mechanism above. One of the assembling structure and the clamping structure is installed on the infant carrying mechanism, and another of the assembling structure and the clamping structure is installed on the carrier body.

The carrier provided by the present application includes the infant carrying mechanism, the carrier body, and the assembling mechanism. The infant carrying mechanism and the carrier body may be detachably installed by means of the assembling mechanism. Therefore, when the operator operates the releasing button, the releasing button drives the locking member to move to the unlocked position, the locking member is correspondingly released from the locking of the locked member, and the releasing button will be locked and positioned by the holding device, thus forcing the locking member to be released from the locked member, and keeping the assembling structure and the clamping structure at the unlocked state, so that the infant carrying mechanism and the carrier body are released. At this time, the infant carrying mechanism may be easily removed from the carrier body.

DETAILED DESCRIPTION OF THE EMBODIMENTS

In order to illustrate the technical content and structural features of the present application in detail, the present application will be further described in conjunction with the embodiments and the accompanying drawings.

Figure 1:
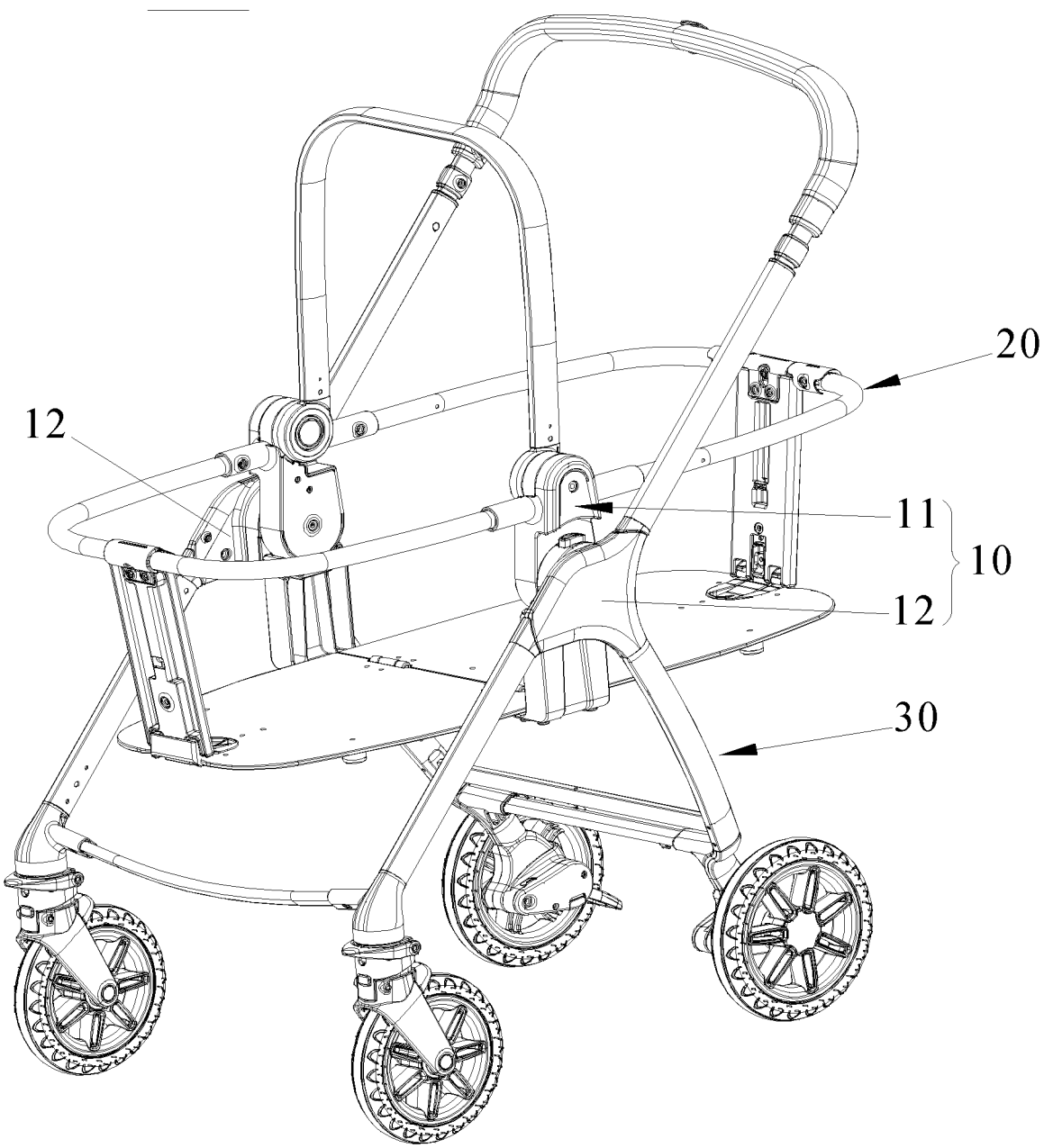
FIG. 1 is a schematic three-dimensional structural view of a carrier according to a first embodiment provided by the present application.
Figure 2:
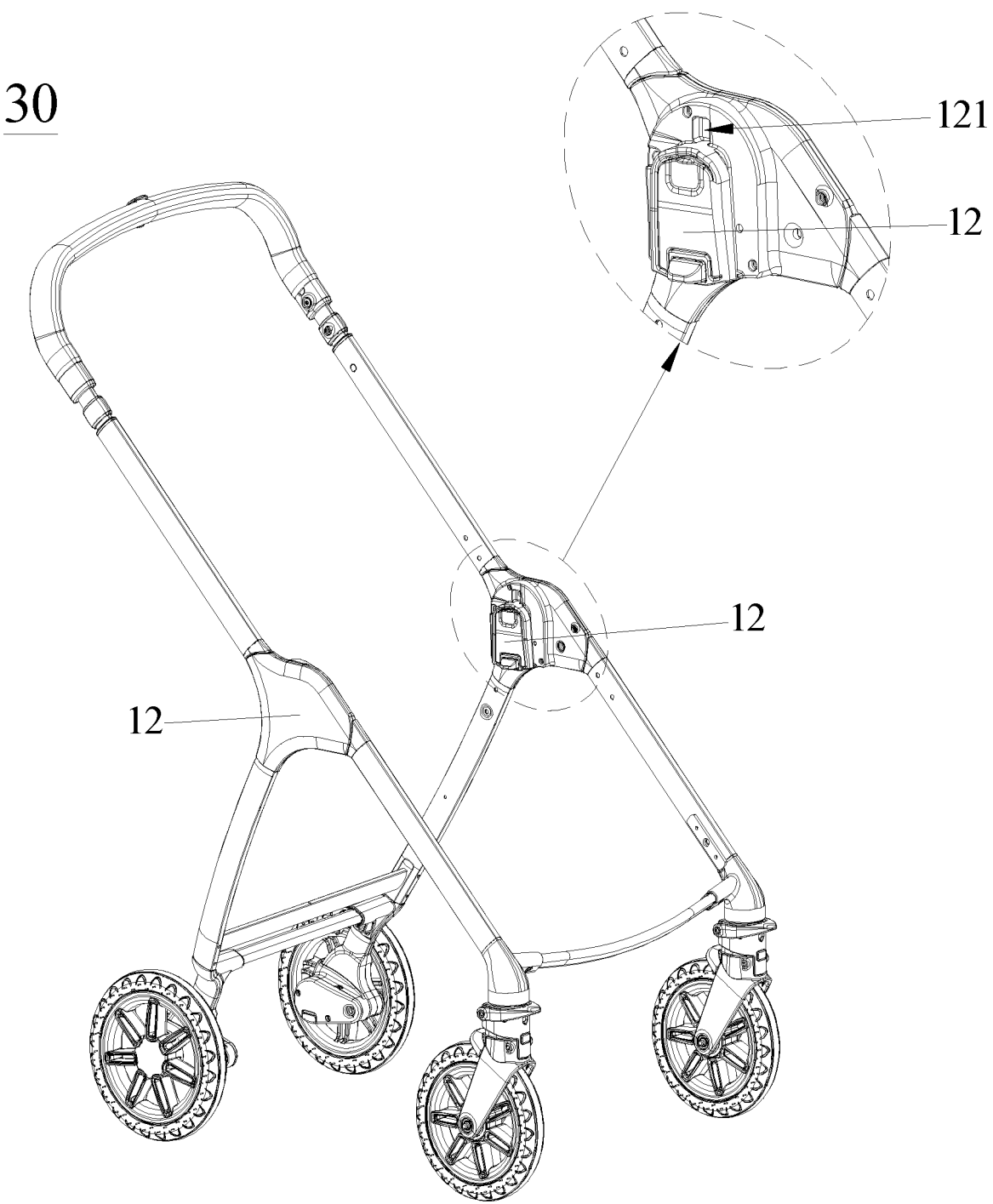
FIG. 2 is a schematic three-dimensional structural view of a carrier body of the carrier shown in FIG. 1.
Figure 3:
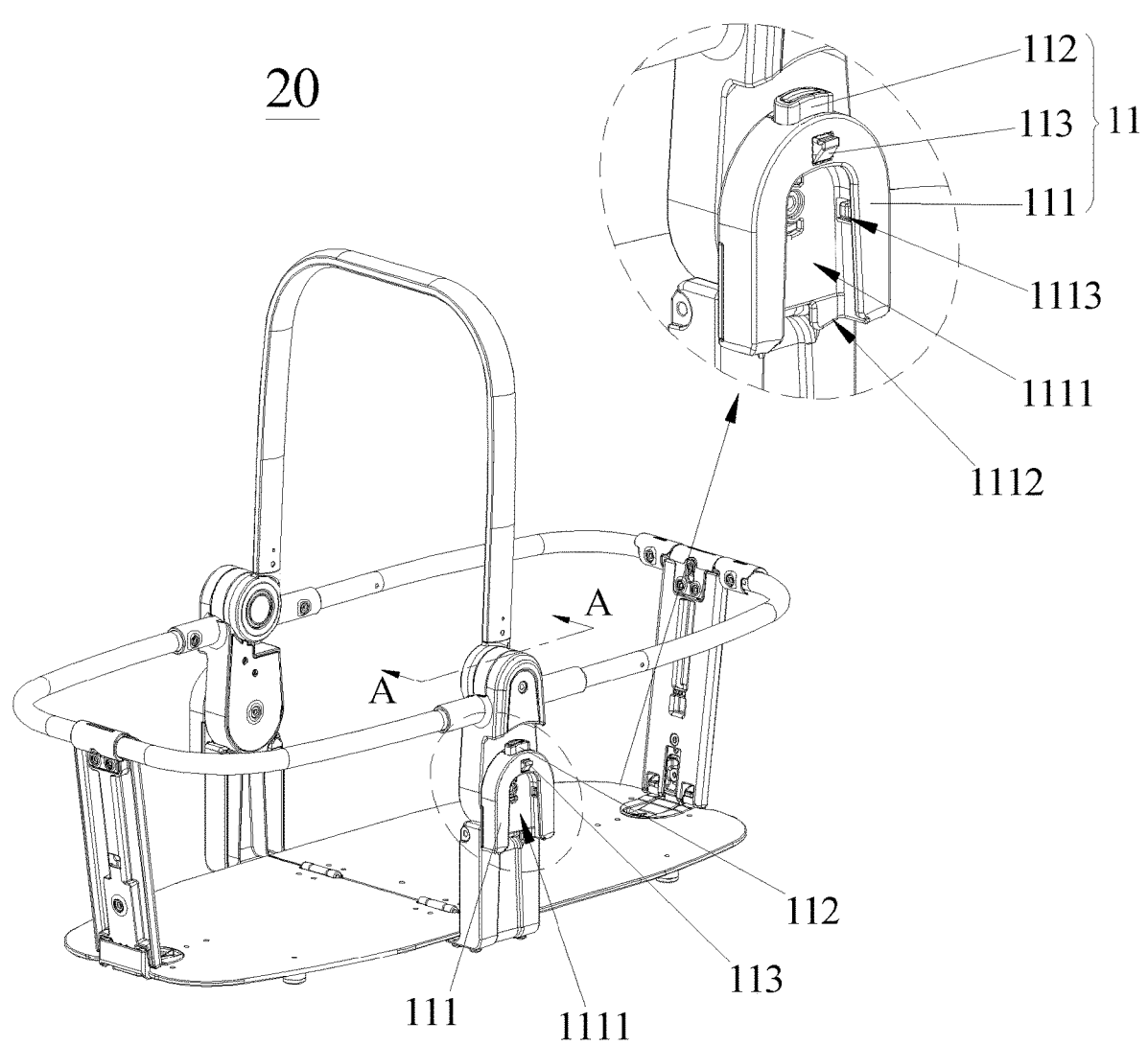
FIG. 3 is a schematic three-dimensional structural view of an infant carrying mechanism of the carrier shown in FIG. 1.
Figure 4:
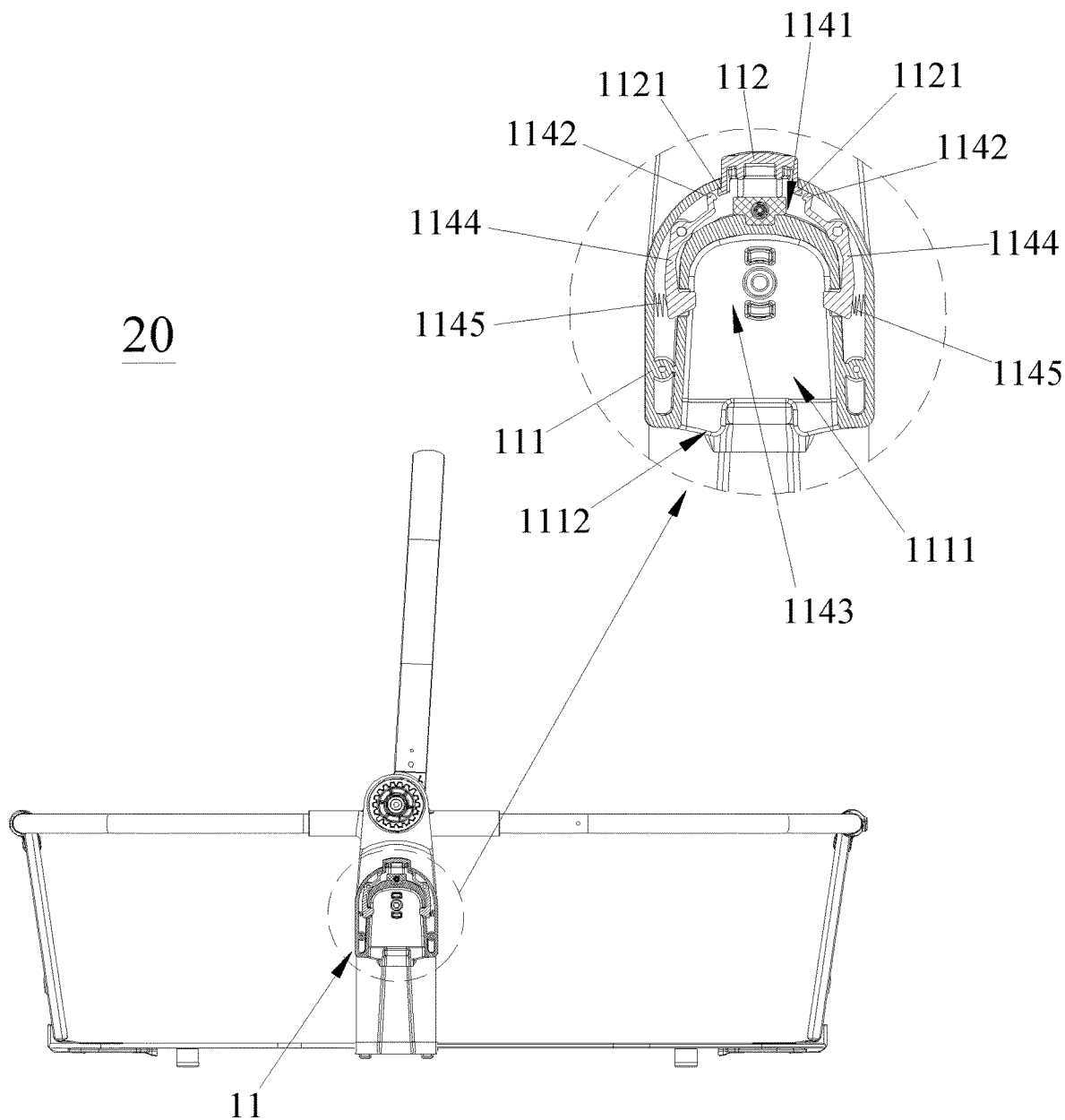
FIG. 4 is a sectional view of a planar structure along a line A-A in FIG. 3.
Figure 5:
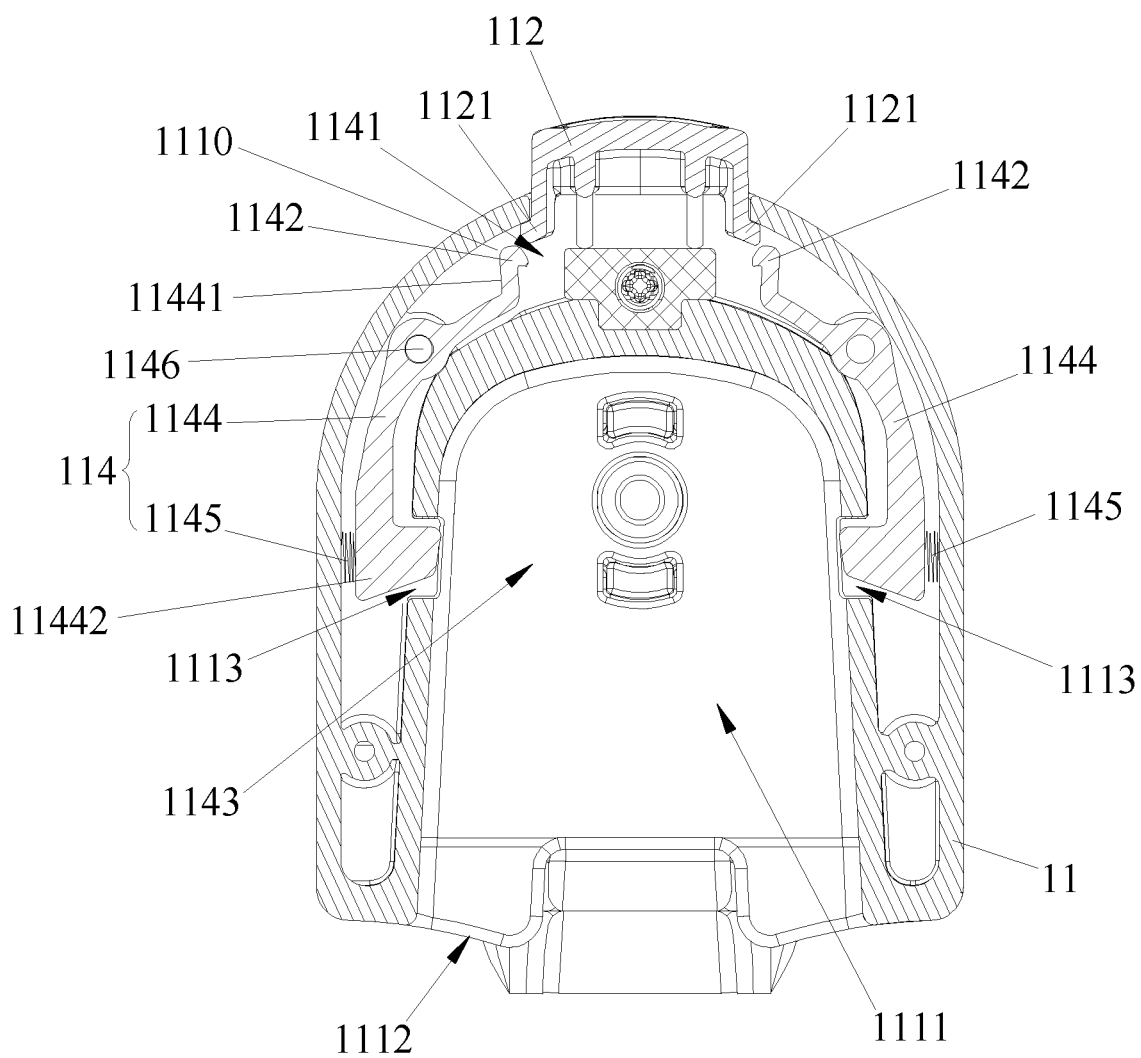
FIG. 5 is a sectional view of a planar structure of an assembling structure on the infant carrying mechanism shown in FIG. 4 when a clamping opening opens and a locking opening narrows.

As shown in FIGS. 1 to 3, a carrier 100 of the present application includes an assembling mechanism 10, an infant carrying mechanism 20, and a carrier body 30. The infant carrying mechanism 20 and the carrier body 30 are detachably installed by means of the assembling mechanism 10. Specifically, the assembling mechanism 10 includes an assembling structure 11 and a clamping structure 12 that may be pluggable into and detachably locked with each other. The assembling structure 11 is installed on the infant carrying mechanism 20, and the clamping structure 12 is installed on the carrier body 30. The assembling mechanism 10 allows the infant carrying mechanism 20 to be reliably installed on the carrier body 30, and facilitates the disassembly of the infant carrying mechanism 20 and the carrier body 30 as well. Preferably, according to actual requirement, the clamping structure 12 may be optionally installed on the infant carrying mechanism 20, and correspondingly, the assembling structure 11 is installed on the carrier body 30, which enables the carrying mechanism 20 and the carrier body 30 to be detachably installed as well. For example, the infant carrying mechanism 20 is a device capable of carrying an infant or a young child, such as a carry cot or a car seat. The carrier body 30 includes mainly two categories. One category is the carrier body 30 capable of providing a moving function, such as a stroller frame, and the other category is a carrier body 30 that may provide a fixing and supporting function, such as a baby dining chair frame. The carry cot, the car seat, the stroller frame, and the baby dining chair all may adopt the existing and known structure, and will not be described repeatedly herein. The structure of the assembling mechanism 10 of the present application will be further illustrated combining with FIGS. 1 to 7 hereafter.

As shown in FIGS. 1 to 3, the clamping structure 12 is provided with a locked member 121 configured to be locked with a locking member 113 (to be described hereafter), and the clamping structure 12 is locked to the assembling structure 11 by means of a locking between the locking member 113 and the locked member 121. Preferably, in this embodiment, the locked member 121 has a slot structure, and the locking member 113 has a block structure, which facilitates the implementation of the arrangement of the locked member 121 and the locking member 113, and the locking and unlocking between the locking member 113 and the locked member 121 is simpler and more straightforward. Of course, the structures of the locked member 121 and the locking member 113 are not limited to such.

More specifically, referring to FIG. 3, in this embodiment, the locking member 113 is, for example, a lock pin. The end of the locking member 113 is, for example, latch tongue-like.

The releasing button 112 (to be described hereafter) and the locking member 113 both are telescopically installed on the body structure 111 (to be described hereafter). The extending and retracting direction of the releasing button 112 is perpendicular to the extending and retracting direction of the locking member 113. When a releasing operation is performed on the releasing button 112, that is, when the releasing button 112 is pressed and moves downward, the releasing button 112 drives the locking member 113 to move, so that the latch tongue of the locking member 113 retracts into the body structure 111, thus realizing a quick release of the locking member 113. In order to facilitate the automatic reset of the releasing button 112, so that the releasing button 112 may automatically move up to extend out of the body structure 111 after the pressing force is canceled, the assembling structure 11 of the embodiment of the present application may also include an elastic member (not shown in the figures). Combined with known technology, the elastic member may be arranged, for example, between the releasing button 112 and the body structure 111, or between the locking member 113 and the body structure 111. The elastic member applies an elastic force to one of the releasing button 112 and the locking member 113, thus providing a driving force for the releasing button 112 to reset and providing a driving force for the locking member 113 to return to a locked position. For example, the elastic member is but not limited to a spring.

As shown in FIGS. 3 to 7, the assembling structure 11 of the present application includes a holding device 114 and the body structure 111, the releasing button 112, and the locking member 113 described above. The releasing button 112 may be movably installed on the body structure 111, and the locking member 113 may be movably installed on the body structure 111. The locking member 113 has at least a locked position and an unlocked position relative to the body structure 111. When the locking member 113 is in the locked position, the locking member 113 is adapted to be locked with the locked member 121 of the clamping structure 12 (as shown in FIG. 3). When the locking member 113 is at the unlocked position, the locking member 113 is adapted to be separated from the locked member 121 of the clamping structure 12 (not shown in the figures). The releasing button 112 is arranged in linkage with the locking member 113. As described above, after being pressed, the releasing button 112 drives the locking member 113 to move, so that the locking member 113 is switched from the locked position to the unlocked position. The holding device 114 is arranged in the body structure 111. When the assembling structure 11 and the clamping structure 12 are locked with each other, the releasing button 112 that moves down after being pressed is locked by the holding device 114 and is positioned at a position of releasing the locking member 113, keeping the locking member 113 at the unlocked position. In this way, when the assembling structure 11 is locked with the clamping structure 12, and when the releasing button 112 is pressed and moves down by operating the releasing button 112, the releasing button 112 will drive the locking member 113 to switch from the locked position to the unlocked position, thereby releasing the locking between the assembling structure 11 and the clamping structure 12. Because the releasing button 112 is locked by the holding device 114 and is positioned at a position of releasing the locking member 113, the locking member 113 is kept at the unlocked position. At this time, even if the pressing force applied to the releasing button 112 is canceled, the assembling structure 11 and the clamping structure 12 are still be unlocked with each other, and the clamping structure 12 may be easily removed from the assembling structure 11, so the infant carrying mechanism 20 may be easily removed from the carrier body 30, thereby improving the convenience of disassembling the carrier. Preferably, the releasing button 112 and the holding device 114 are locked with each other by means of but not limited to the engaging manner.

As shown in FIGS. 4 to 7, the releasing button 112 is telescopically installed on the body structure 111, and the holding device 114 releases the releasing button 112 after the assembling structure 11 and the clamping structure 12 are separated, so that the releasing button 112 extends out of the body structure 111 and resets. The automatic reset of the releasing button 112 makes a following unlocking operation convenient. Of course, according to actual needs, the releasing button 112 may also be installed on the body structure 111 by other means (such as a sliding installation, etc.). For example, in this embodiment, the releasing button 112 is forced to retract into the body structure 111 by pressing, and during the process of retracting into the body structure 111, the pressed releasing button 112 drives the locking member 113 to switch from the locked position to the unlocked position. Of course, according to actual needs, in other embodiments, the releasing button 112 may also be driven to move in other ways (such as dialing, pulling, etc.).

Figure 6:
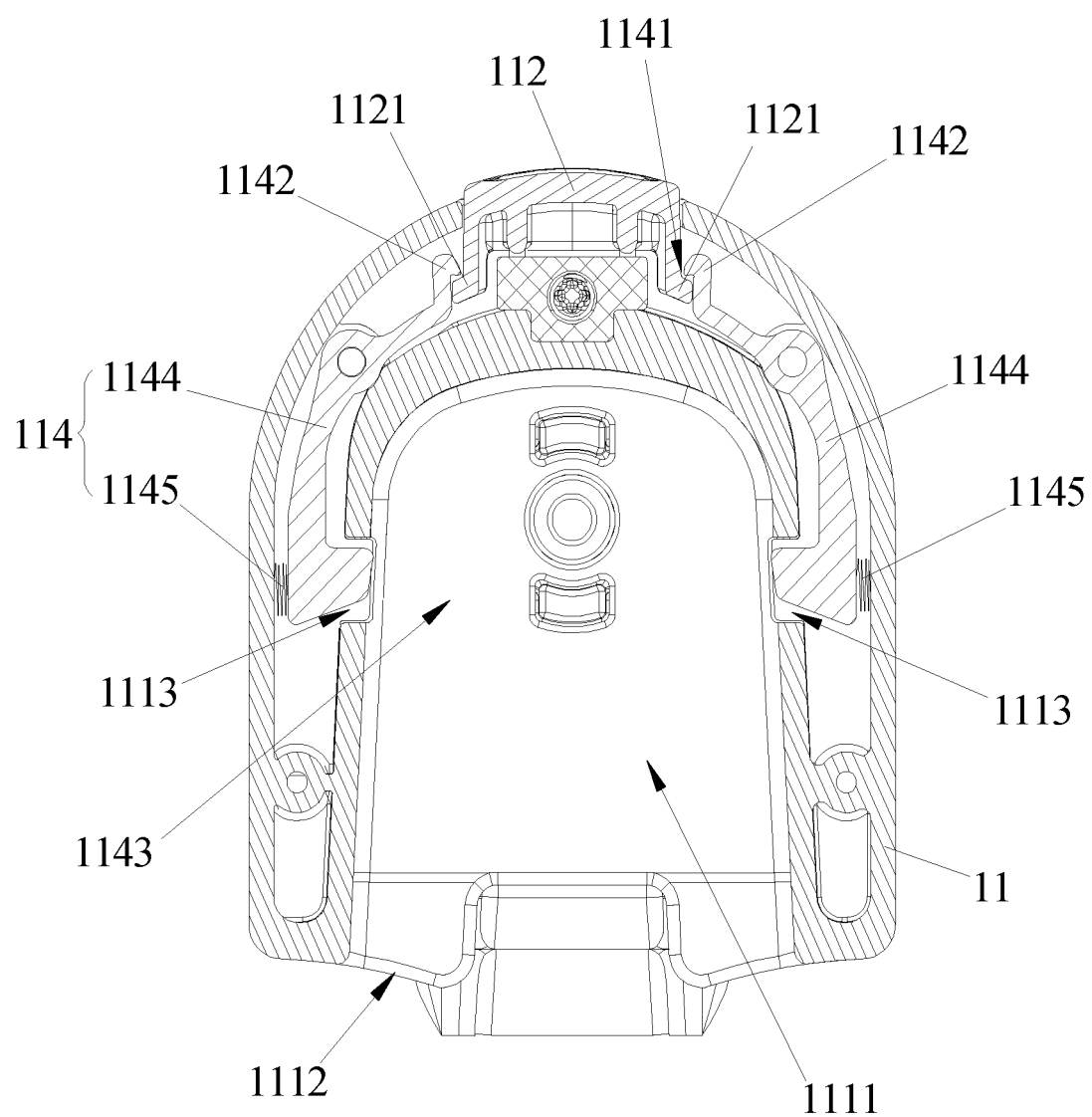
FIG. 6 is a sectional view of the plane structure of the assembling structure, when the releasing button shown in FIG. 5 is pressed down and the releasing button is inserted into the locking opening to engage with a holding device.

Referring to FIG. 6, in this embodiment, the holding device 114 includes a locking opening 1141, and the pressed releasing button 112 is inserted into the locking opening 1141 to engage with the holding device 114, so that the releasing button 112 may be quickly locked with the holding device 114. More specifically, the holding device 114 may include a blocking part 1142 that defines the locking opening 1141, and the pressed releasing button 112 is inserted into the locking opening 1141 to block the blocking part 1142. By means of the blocking part 1142, the releasing button 112 may be reliably locked to the holding device 114. In order to improve the stability of the engaging between the releasing button 112 and the holding device 114, a blocked part 1121 is arranged on the releasing button 112. When the releasing button 112 is inserted into the locking opening 1141, the blocked part 1121 and the blocking part 1142 block each other, to prevent the releasing button 112 from resetting automatically. For example, in this embodiment, the blocking part 1142 and the blocked part 1121 are but not limited to hook structures or protrusion structures, as long as the releasing button 112 inserted into the locking opening 1141 can reliably engage with the holding device 114 to avoid an undesired automatic reset of the releasing button 112.

As shown in FIGS. 3 to 7, the locking opening 1141 defined by the blocking part 1142 may open or narrow automatically. When the locking opening 1141 opens, the releasing button 112 is released from the holding device 114, and the holding device 114 may easily release the releasing button 112, thus allowing the releasing button 112 to reset automatically. Specifically, the holding device 114 also includes a clamping opening 1143 allowing the clamping structure 12 to be inserted. The clamping opening 1143 and the locking opening 1141 have a linkage relationship and the movement trends thereof are opposite. That is, when the clamping opening 1143 narrows, the locking opening 1141 opens, and on the contrary, when the clamping opening 1143 opens, the locking opening 1141 narrows. Thus, the locking opening 1141 may be controlled to narrow or open by operating the clamping opening 1143 to narrow or open accordingly, which may conveniently control an opening size of the locking opening 1141.

Figure 7:
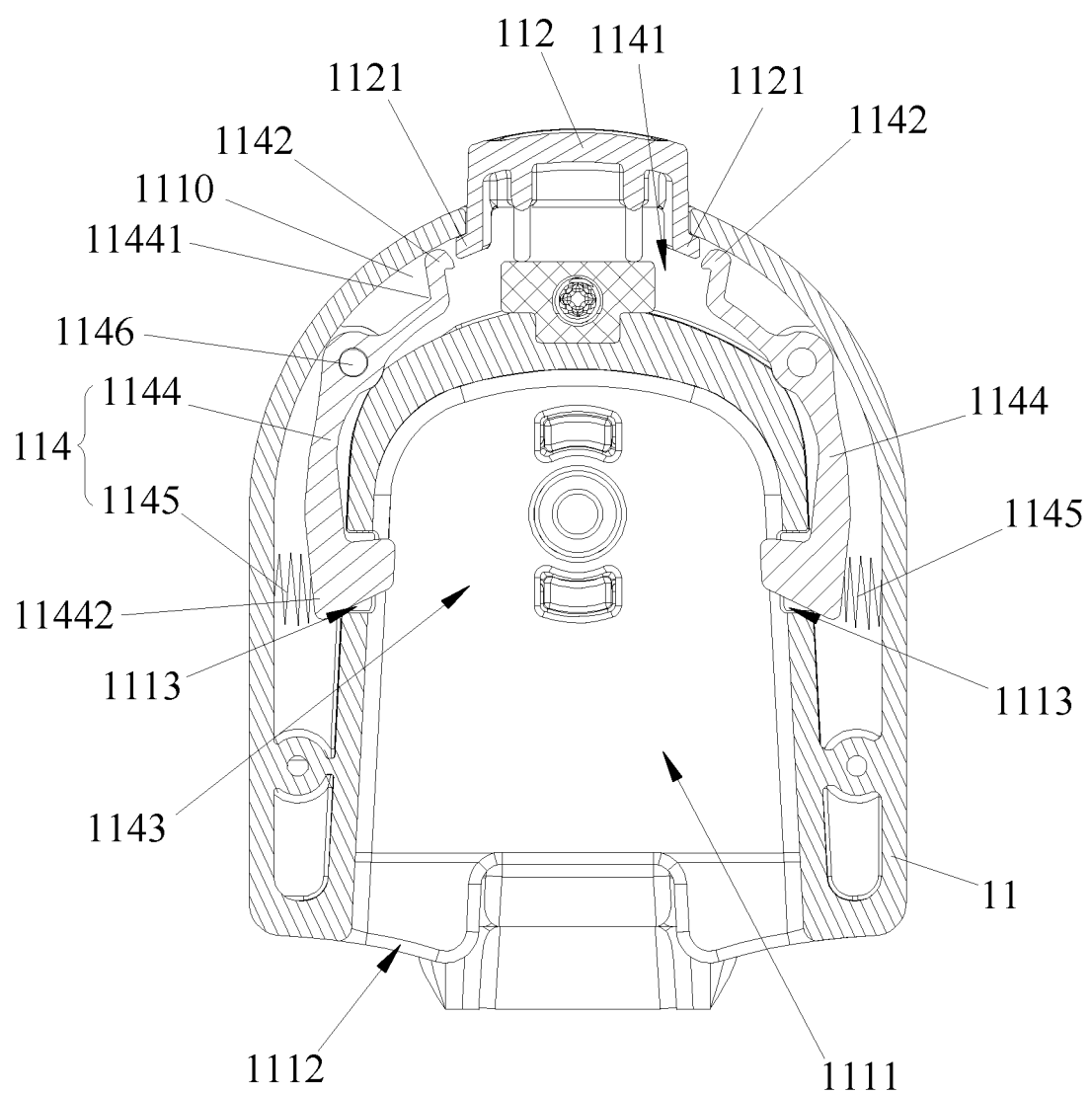
FIG. 7 is a sectional view of the planar structure of the assembling structure on the infant carrying mechanism shown in FIG. 4, when the clamping opening narrows and the locking opening opens.

Referring to FIG. 6, in order to facilitate the locking engagement between the assembling structure 11 and the clamping structure 12, an assembling part 1111 may be provided on the body structure 111, and the assembling part 1111 is configured to engage with the clamping structure 12, and the assembling part 1111 is, for example, a slot allowing the clamping structure 12 to be inserted. The assembling part 1111 has an installation opening 1112 allowing the clamping structure 12 to be inserted. A through hole 1113 may be disposed in the wall of the assembling part 1111, and is in communication with the inner cavity 1110 of the body structure 111. Two movable members 1144 are arranged inside the inner cavity 1110 of the body structure 111. A middle part of each movable member 1144 is pivotally connected to the body structure 111 by the pivot 1146. The blocking part 1142 is arranged at a first end 11441 of the movable member 1144, and a second end 11442 of the movable member 1144 is telescopically arranged in the through hole 1113. When the locking opening 1141 opens, the second end 11442 of the movable member 1144 extends into the assembling part 1111 through the through hole 1113, and when the locking opening 1141 narrows, the second end 11442 of the movable member 1144 retracts into the inner cavity 1110 of the body structure 111 through the through hole 1113. In this way, referring to FIG. 5, when the clamping structure 12 engages with the assembling part 1111, the clamping structure 12 may push the second end 11442 of the movable member 1144 to retract into the body structure 111, so that the clamping opening 1143 of the holding device 114 opens and the locking opening 1141 narrows, which prepares for the insertion of the releasing button 112. Referring to FIG. 7, when the clamping structure 12 is released from the assembling part 1111, the second end 11442 of the movable member 1144 extends into the assembling part 1111, which causes the clamping opening 1143 of the holding device 114 to narrow and the locking opening 1141 to open, and causes the holding device 114 to automatically release the releasing button 112, thereby allowing the releasing button 112 to reset automatically. In this embodiment, the assembling part 1111 is a slot, and by engaging the clamping structure 12 and the slot, the clamping structure 12 engages with the assembling structure 11. But in other embodiments, the structure of the assembling part 1111 is not limited to the structure above.

As shown in FIGS. 4 to 7, the holding device 114 may include two movable members 1144, the two movable members 1144 are arranged at intervals. The first ends 11441 of the two movable members 1144 define the locking opening 1141 by means of the blocking parts 1142, and the second ends 11442 of the two movable members 1144 define the clamping opening 1143.

Such a holding device 114 has a simple structure and is easy to install and arrange. In some embodiments, the movable member 1144 is arranged, for example, to be bent, to improve the structural performance of the movable member 1144. In order that the locking opening 1141 of the holding device 114 may automatically open and reset when the assembling structure 11 and the clamping structure 12 are separated, the holding device 114 also includes a reset member 1145 arranged between the movable member 1144 and the body structure 111. The reset member 1145 tends to drive the two movable members 1144 to rotate, to force the locking opening 1141 to open. For example, the reset member 1145 is a spring. Of course, according to actual needs, the reset member 1145 may also be a compression spring or a torsional spring, which may also achieve the purpose of driving the two movable members 1144 to rotate, so the reset member is not limited to the structure above.

A process of disassembling the carrier provided by the first embodiment of the present application will be described combing with FIGS. 1 to 7 hereafter.

Referring to FIGS. 1 to 3, and FIG. 5, when the carrier 100 is in a normal use state, the infant carrying mechanism 20 is installed on the carrier body 30, the clamping structure 12 engages with the assembling member 1111, the locking member 113 engages with the locked member 121, and the clamping structure 12 and the assembling structure 11 engage with each other. At this time, the clamping structure 12 pushes the second end 11442 of the movable member 1144 to retract into the body structure 111 of the assembling structure 11, so that the clamping opening 1143 opens and the locking opening 1141 narrows.

Referring to FIG. 6, when the infant carrying mechanism 20 needs to be removed from the carrier body 30, after the operator presses the releasing button 112 down, the releasing button 112, during the process of retracting into the body structure 111, drives the locking member 113 to retract into the body structure 111, and the locking member 113 is released from the locked member 121, thus releasing the assembling structure 11 and the clamping structure 12. When the releasing button 112 is inserted into the locking opening 1141, the blocked part 1121 of the releasing button 112 first drives the blocking part 1142 of the movable member 1144 to elastically deform, so that the locking opening 1141 opens. After the blocked part 1121 gets across the blocking part 1142, the blocked part 1121 and the blocking part 1142 hook each other and engage with each other, so that the releasing button 112 is locked at a position, and the assembling structure 11 and the clamping structure 12 are kept in the unlocked state.

Referring to FIG. 7, the operator may then remove the infant carrying mechanism 20 from the carrier body 30. During this process, the clamping structure 12 disengages from the assembling member 1111, and under the push of the reset member 1145, the second end 11442 of the movable member 1144 extends into the assembling member 1111 through the through hole 1113, thus causing the clamping opening 1143 to narrow and the locking opening 1141 to open.

The blocking part 1142 on the movable member 1144 is released from the blocked part 1121 of the releasing button 112. Under the push of the elastic member, the releasing button 112 automatically extends out of the body structure 111, and the locking member 113 also extends out of the body structure 111, which prepares for a following release operation.

Figure 8:
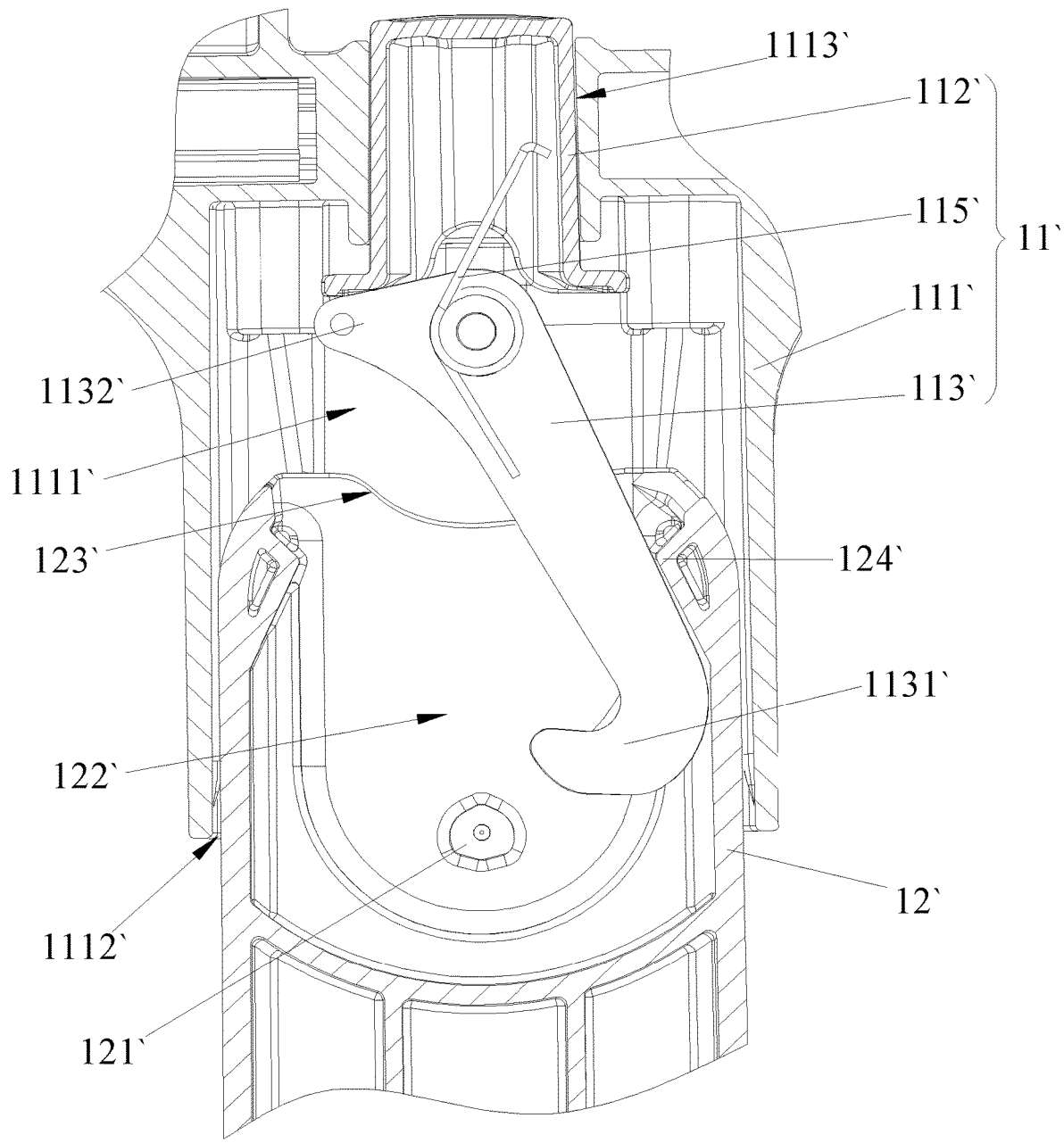
FIG. 8 is a sectional view of the plane structure of the assembling mechanism according to a second embodiment provided by the present application, when the clamping structure engages with the assembling structure and the releasing button is pressed down into the locking opening to engage with the holding device.
Figure 9:
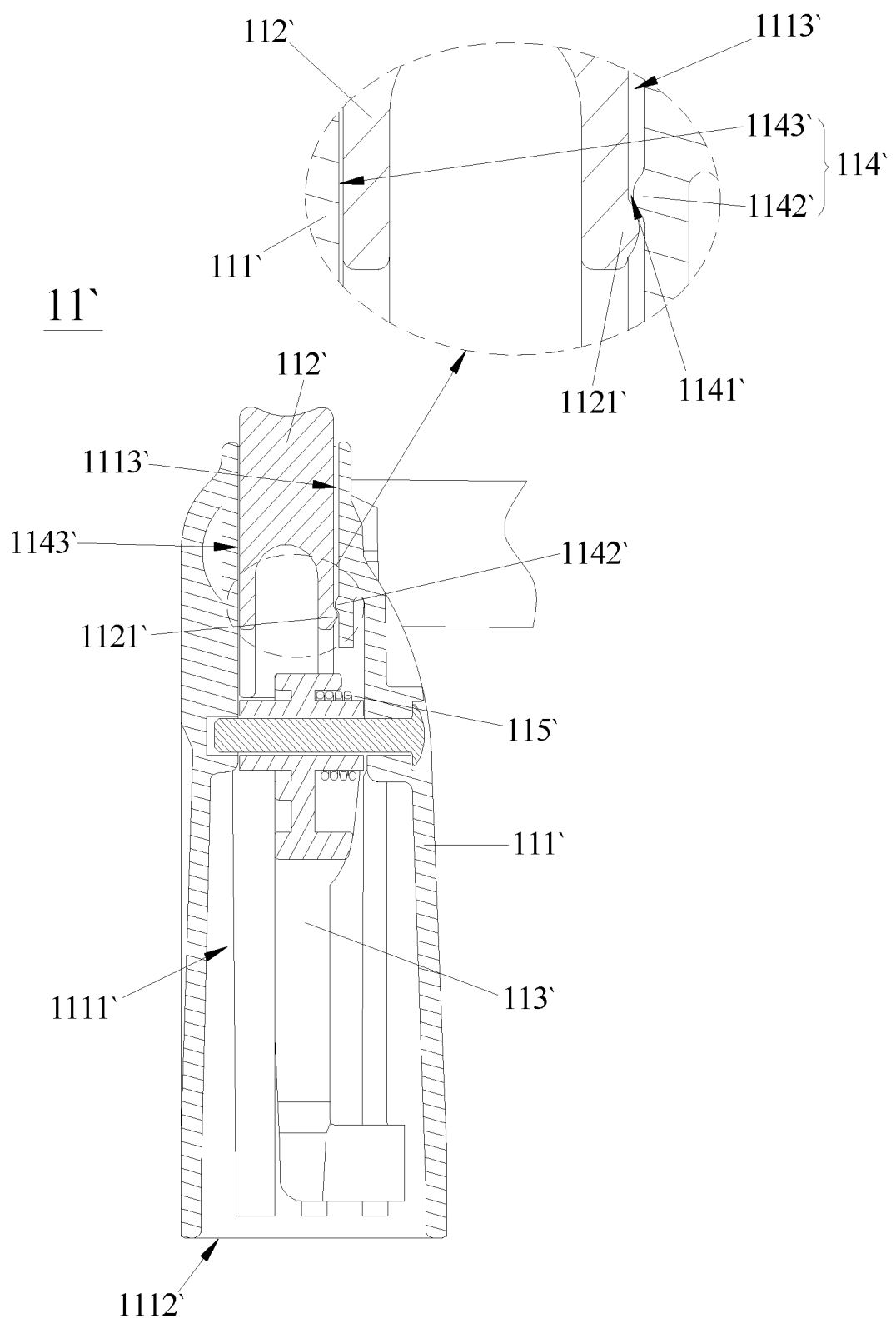
FIG. 9 is a sectional view of the planar structure of the assembling structure shown in FIG. 8 in a side view direction.
Figure 10:
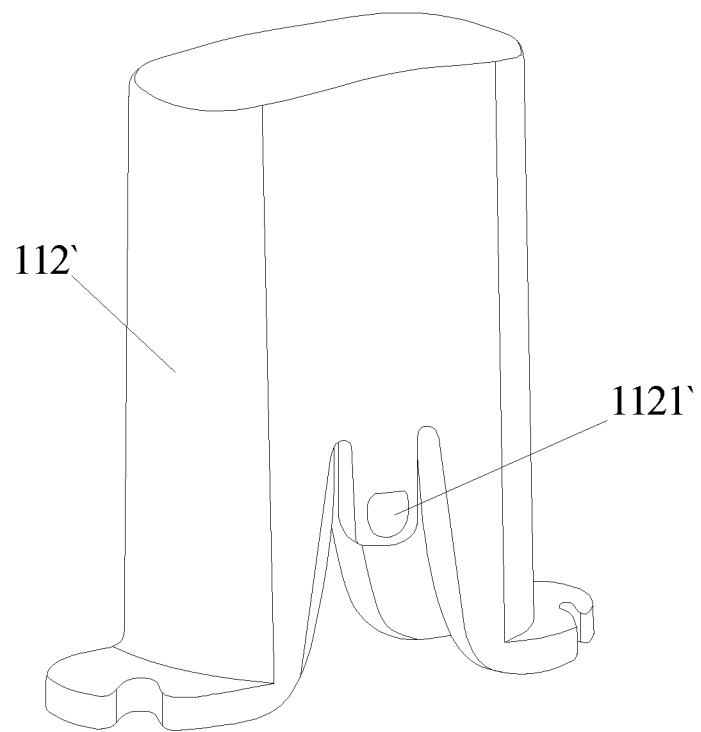
FIG. 10 is a schematic three-dimensional structural view of the releasing button according to the second embodiment provided by the present application.

As shown in FIGS. 8 to 10, schematic structural diagrams of an assembling mechanism 10' of a second embodiment provided by the present application, in this embodiment, the structure of the assembling mechanism 10' is basically identical with the structure of the assembling mechanism 10 of the first embodiment. The main differences are as follows.

1. The blocking part 1142' and the blocked part 1121' are but not limited to convex structures. For example, one is a convex strip, and the other is a convex block.
2. The locking member 113' is pivotally connected to the body structure 111' and is arranged inside the assembling member 1111'.
3. The assembling structure 11' also includes a reset elastic member 115'. The reset elastic member 115' is arranged between the releasing button 112' and the body structure 111'. The reset elastic member 115' applies a force to the locking member 113', to force the locking member 113' to pivot to the locked position.

4. The locking member 113' is but not limited to a hook arm structure. The assembling member 1111' is an open cavity structure with an installation opening 1112' allowing the clamping structure to be inserted. The releasing button 112' is pressed down and pushes the locking member 113' to pivot from the locked position to the unlocked position.

5. A button channel 1113' is arranged on the body structure 111', and the button channel 1113' is configured to allow the releasing button 112' to slide. The blocking part 1142' is formed and protrudes from a wall of the button channel 1113'. The blocking part 1142' may not surround the channel wall. Referring to FIG. 9, the channel wall (also called a positioning side wall 1143') of the button channel 1113' together with the blocking part 1142' forms the holding device 114'. The blocking part 1142' and the positioning side wall 1143' define the locking opening 1141'.

6. The first end of the locking member 113' is a hook 1131', the second end of the locking member 113' is bent to form a pushing structure 1132', and the releasing button 112' and the pushing structure 1132' of the locking member 113' are arranged to push against each other.

7. The locked member 121' on the clamping structure 12' may be but is not limited to a rod allowing the hook 1131' of the locking member 113' to hook.

8. The clamping structure 12' is provided with a connecting cavity 122', and the locked member 121' is installed in the connecting cavity 122'. The end of the clamping structure 12' is provided with a joint opening 123'. The joint opening 123' and the connecting cavity 122' communicate. When the clamping structure 12' engages with the assembling structure 11', the locking member 113' is inserted into the connecting cavity 122' through the joint opening 123', hooks and locks the locked member 121'.

9. Referring to FIG. 8, the clamping structure 12' is provided with a protrusion 124', and the protrusion 124' protrudes toward the connecting cavity 122' from the joint opening 123'. When the clamping structure 12' engages with the assembling structure 11', and when the releasing button 112' is locked at the position where the locking member 113' is released, the protrusion 124' rests against the locking member 113'. When the clamping structure 12' and the assembling structure 11' are separated, the protrusion 124' exerts a force on the locking member 113' to drive the locking member 113' to rotate to the locked position.

The other structures of this embodiment may be the same or similar to those of the first embodiment, therefore they will not be described repeatedly herein.

The disassembling process of the carrier provided by the second embodiment of the present application will be illustrated with reference to FIGS. 8 to 10.

When the carrier 100 is in a normal use state, the infant carrying mechanism 20 is installed on the carrier body 30. At this time, the clamping structure 12' is locked into the assembling member 1111', the hook 1131' of the locking member 113' hooks the locked member 121', and the clamping structure 12' and the assembling structure 11' are engaged and locked with each other.

When the infant carrying mechanism 20 needs to be removed from the carrier body 30, the operator presses the releasing button 112' down, and while retracting into the body structure 111', the releasing button 112' pushes the locking member 113' to pivot, so that the locking member 113' is released from the locked member 121', thus releasing the locking between the assembling structure 11' and the clamping structure 12', so that the locking member 113' finally rests against the protrusion 124'. When the releasing button 112' is inserted into the locking opening 1141', the blocked part 1121' on the elastic arm of the releasing button 112' and the blocking part 1142' of the holding device 114' block each other, forcing the releasing button 112' to be locked, and keeping the assembling structure 11' and the clamping structure 12' in the unlocked state.

Then, the operator may remove the infant carrying mechanism 20 from the carrier body 30. During this process, the clamping structure 12' exits the assembling member 1111', the protrusion 124' on the clamping structure 12' pushes the locking member 113' to pivot to the locked position. At the same time, the reset elastic member 115' drives the locking member 113' to rotate to the locked position. The rotation of the locking member 113' to the locked position drives the pushing structure 1132' thereof to push the releasing button 112', so that the blocked part 1121' on the releasing button 112' is released from the blocking of the blocking part 1142'. The releasing button 112' extends out of the body structure 111' and resets, and the locking member 113' moves to the locked position accordingly.

Compared with the prior art, the assembling structure 11 (11') of the present application is further provided with the holding device 114 (114'), and the releasing button 112 (112') is locked by the holding device 114 (114') when the locking member 113 (113') is at the unlocked position and is positioned at a position releasing the locking member, so that the locking member 113 (113') is kept at the unlocked position. Therefore, in an actual application, when the assembling structure 11 (11') is locked with the clamping structure 12 (12'), first the releasing button 112 (112') is operated, and by means of the releasing button 112 (112'), the locking member 113 (113') is switched to the unlocked position. The releasing button 112 (112') will be locked and positioned by the holding device 114 (114'), so that the locking member 113 (113') keeps at the unlocked position, thus causing the assembling structure 11 (11') and the clamping structure 12 (12') to be in the unlocked state. At this time, the clamping structure 12 (12') may be easily removed from the assembling structure 11 (11').

It should be understood that, the assembling mechanism 10 (10') of the present application includes the assembling structure 11 (11') and the clamping structure 12 (12') that may be pluggable in, detachable from and lockable with each other, the locked member 121 (121') is arranged on the clamping structure 12 (12') to allow the locking member 113 (113') to be locked. Therefore, when the assembling structure 11 (11') and the clamping structure 12 (12') are plugged in and locked with each other, by operating the releasing button 112 (112'), the releasing button 112 (112') may drive the locking member 113 (113') to move, forcing the locking member 113 (113') to move to the unlocking position, and the locking member 113 (113') will be released from the locked member 121 (121') accordingly. The releasing button 112 (112') will be positioned and locked by the holding device 114 (114'). The locking member 113 (113') is released from the locked member 121 (121'), thus causing the assembling structure 11 (11') and the clamping structure 12 (12') to be in the unlocked state. At this time, the clamping structure 12 (12') may be conveniently removed from the assembling structure 11 (11').

The carrier 100 provided by the embodiment of the present application may include the infant carrying mechanism 20, the carrier body 30, and the assembling mechanism 10 (10'). The infant carrying mechanism 20 and the carrier body 30 may be detachably installed by means of the assembling mechanism 10 (10'). When the operator operates the releasing button 112 (112'), the releasing button 112 (112') drives the locking member 113 (113') to move to the unlocked position, the locking member 113 (113') is correspondingly released from the locked member 121 (121'), and the releasing button 112 (112') will be locked and positioned by the holding device 114 (114'), thus forcing the locking member 113 (113') to be released from the locked member 121 (121'), and causing the assembling structure 11 (11') and the clamping structure 12 (12') to be kept in the unlocked state, so that the infant carrying mechanism 20 and the carrier body 30 are released. At this time, the infant carrying mechanism 20 may be easily removed from the carrier body 30.

What disclosed above are only preferred examples of the present application, but not intended to limit the scope of claims of the present application. Therefore, equivalent changes made according to the claims of the present application fall within the scope of the present application.

What is claimed is:

1. An assembling structure comprising:
   a body structure comprising an assembling part configured to engage with a clamping structure;
   a releasing button, installed on the body structure;
   a locking member, installed on the body structure, and having a locked position and an unlocked position, wherein when a releasing operation is performed, the releasing button drives the locking member to switch from the locked position to the unlocked position; and
   a holding device, arranged in the body structure and configured to lock the releasing button at a position keeping the locking member at the unlocked position, wherein the holding device comprises a locking opening, and a clamping opening configured to allow the clamping structure to be inserted, the clamping opening opens after the clamping structure is inserted, driving the locking opening to narrow, and the clamping opening narrows after the clamping structure is detached, to allow the locking opening to open.

2. The assembling structure according to claim 1, wherein when the releasing operation is performed, the releasing button is inserted into the locking opening and engages with the holding device.

3. The assembling structure according to claim 2, wherein:
   the holding device comprises a blocking part; and
   the releasing button is inserted into the locking opening and blocks the blocking part.

4. The assembling structure according to claim 3, wherein a blocked part is arranged on the releasing button, and the blocked part and the blocking part block each other when the releasing button is inserted into the locking opening.

5. The assembling structure according to claim 4, wherein the blocking part and the blocked part are hook structures or protrusion structures.

6. The assembling structure according to claim 4, wherein the locking opening is capable of opening, and when the clamping structure is disengaged from the assembling part, the locking opening opens, so that the releasing button is released from the holding device.

7. The assembling structure according to claim 6, wherein:
   the holding device comprises two movable members arranged at intervals in a circumferential direction;
   a middle part of each of the two movable members is pivotally connected to the body structure;
   first ends of the two movable members are provided with the blocking parts respectively, and the blocking parts define the locking opening; and
   second ends of the two movable members define the clamping opening.

8. The assembling structure according to claim 7, wherein the holding device further comprises a reset member arranged between each of the two movable members and the body structure, and the reset member is configured to drive each of the two movable members to rotate to force the locking opening to open.

9. The assembling structure according to claim 7, wherein:
   the assembling part is a slot;
   a through hole is disposed in a wall of the assembling part and is in communication with an inner cavity of the body structure; and
   the second end of each of the two movable members is telescopically arranged in the through hole.

10. The assembling structure according to claim 1, wherein:
    the locking member is telescopically arranged in the body structure, and
    when the releasing operation is performed, the releasing button drives the locking member to retract into the body structure.

11. The assembling structure according to claim 1, wherein:
    the releasing button is telescopically installed on the body structure, and
    the holding device releases the releasing button after the assembling structure disengages from the clamping structure, so that the releasing button extends out of the body structure and resets.

12. The assembling structure according to claim 1, wherein:
    the locking member is pivotally connected to the body structure and arranged in the assembling part;
    a first end of the locking member is provided with a hook; and
    when the releasing operation is performed, the releasing button is pressed down and pushes a second end of the locking member, so that the locking member pivots from the locked position to the unlocked position.

13. The assembling structure according to claim 12, further comprising a reset elastic member, wherein the reset elastic member is arranged between the releasing button and the body structure, and the reset elastic member is configured to apply a force to the locking member to force the locking member to pivot to the locked position.

14. The assembling structure according to claim 12, wherein:
    the body structure has a button channel configured to allow the releasing button to slide;
    the blocking part is arranged on part of a channel wall of the button channel, the blocking part and the channel wall of the button channel define the locking opening.

15. The assembling structure according to claim 12, wherein a second end of the locking member is bent to form a pushing structure, and the releasing button and the pushing structure of the locking member are arranged to push against each other.

16. The assembling structure according to claim 1, wherein:
   the releasing button and the holding device are locked with each other by engaging;
   the body structure comprises a button channel configured to allow the releasing button to slide, the releasing button has an elastic arm, and the elastic arm is provided with a blocked part; and
   the holding device comprises a blocking part arranged on a channel wall of the button channel, and the blocking part is adapted to engage with the blocked part.

17. The assembling structure according to claim 16, wherein:
   the locking member is pivotally connected to the body structure, a first end of the locking member is provided with a hook, a second end of the locking member is provided with a pushing structure, and the releasing button is configured to push the pushing structure to force the locking member to pivot to the unlocked position;
   the assembling structure is further provided with a reset elastic member, and when the clamping structure disengages with the assembling structure, the clamping structure and the reset elastic member cooperate to drive the locking member to pivot from the unlocked position to the locked position, while the pushing structure pushes the releasing button to reset.

18. An assembling mechanism, comprising an assembling structure and a clamping structure that are pluggable in, detachable from and lockable with each other, wherein:
   the assembling structure is the assembling structure of claim 1;
   a locked member is arranged on the clamping structure and configured to be locked with the locking member, and the clamping structure is locked on the assembling structure by a locking between the locking member and the locked member.

19. The assembling mechanism according to claim 18, wherein:
   the releasing button and the holding device are locked with each other by engaging;
   the body structure comprises a button channel configured to allow the releasing button to slide, the releasing button has an elastic arm, and the elastic arm is provided with a blocked part;
   the holding device comprises a blocking part arranged on a channel wall of the button channel, and the blocking part is adapted to engage with the blocked part;
   the locking member is pivotally connected to the body structure, a first end of the locking member is provided with a hook, a second end of the locking member is provided with a pushing structure, and the releasing button is configured to push the pushing structure to force the locking member to pivot to the unlocked position; and
   the assembling structure is further provided with a reset elastic member, and when the clamping structure disengages with the assembling structure, the clamping structure and the reset elastic member cooperate to drive the locking member to pivot from the unlocked position to the locked position, while the pushing structure pushes the releasing button to reset;

and
   the clamping structure is locked on the assembling structure by a locking between a hook of the locking member and the locked member.

20. The assembling mechanism according to claim 19, wherein:
   the clamping structure is provided with a connecting cavity;
   the locked member is installed in the connecting cavity;
   an end of the clamping structure is provided with a joint opening in communication with the connecting cavity; and
   when the clamping structure engages with the assembling structure, the locking member is inserted into the connecting cavity through the joint opening to lock the locked member.

21. The assembling mechanism according to claim 20, wherein:
   the clamping structure is provided with a protrusion disposed at the joint opening;
   when the clamping structure engages with the assembling structure, and the releasing button is locked at a position where the locking member is released, the protrusion rests against the locking member; and
   when the clamping structure and the assembling structure are disengaging, the protrusion drives the locking member to rotate to the locked position.

22. A carrier, comprising an infant carrying mechanism, a carrier body, and an assembling mechanism, wherein:
   the infant carrying mechanism and the carrier body are detachably installed by the assembling mechanism, and the assembling mechanism is the assembling mechanism of claim 18;
   one of the assembling structure and the clamping structure is installed on the infant carrying mechanism, and another of the assembling structure and the clamping structure is installed on the carrier body.

23. An assembling structure comprising:
   a body structure;
   a releasing button, installed on the body structure;
   a locking member, installed on the body structure, and having a locked position and an unlocked position, wherein when a releasing operation is performed, the releasing button drives the locking member to switch from the locked position to the unlocked position; and
   a holding device, arranged in the body structure and configured to lock the releasing button at a position keeping the locking member at the unlocked position, wherein the releasing button and the holding device are locked with each other by engaging;
   the body structure has an inner cavity, and an assembling part configured to engage with a clamping structure, and a through hole is arranged in a wall of the assembling part and is in communication with the inner cavity of the body structure;
   the holding device comprises a movable member and a reset member, and the movable member and the reset member are disposed in the inner cavity; a middle part of the movable member is pivotally connected to the body structure; a first end of the movable member is provided with a blocking part configured to block the releasing button; and a second end of the movable member is telescopically arranged in the through hole;
   when the clamping structure disengages from the assembling part, the reset member applies an elastic force to the movable member, so that the second end of the movable member extends from the through hole and the blocking part disengages from the releasing button.

24. The assembling structure according to claim 23, wherein:
- the holding device comprises two movable members and two reset members, each of the two movable members is bent in shape;
- the assembling part is disposed between the two movable members and is a slot; and
- the releasing button is disposed between the two movable members.

25. The assembling structure according to claim 24, wherein:
- the releasing button and the locking member both are telescopically installed on the body structure, and a moving direction of the releasing button is perpendicular to a moving direction of the locking member;
- the assembling structure is further provided with an elastic member, and the elastic member is configured to drive the releasing button to reset and configured to drive the locking member to return to the locked position.

* * * * *